United States Patent
Bosworth et al.

(10) Patent No.: US 10,325,273 B2
(45) Date of Patent: *Jun. 18, 2019

(54) USER SELECTED AFFILIATION WITH BRANDS IN A SOCIAL NETWORKING SYSTEM

(75) Inventors: Andrew G. Bosworth, Palo Alto, CA (US); William Blakeley Chandlee, Westport, CT (US); Ravi Mahesh Daswani Buxani, London (GB)

(73) Assignee: Facebook, Inc., Menlo Park, CA (US)

( * ) Notice: Subject to any disclaimer, the term of this patent is extended or adjusted under 35 U.S.C. 154(b) by 679 days.

This patent is subject to a terminal disclaimer.

(21) Appl. No.: 13/614,359

(22) Filed: Sep. 13, 2012

(65) Prior Publication Data
US 2014/0074926 A1   Mar. 13, 2014

(51) Int. Cl.
*G06Q 50/00* (2012.01)
*G06Q 30/02* (2012.01)

(52) U.S. Cl.
CPC .......... *G06Q 30/02* (2013.01); *G06Q 50/01* (2013.01)

(58) Field of Classification Search
CPC .............................. G06Q 50/01; G06Q 30/02
See application file for complete search history.

(56) References Cited

U.S. PATENT DOCUMENTS

| | | | | |
|---|---|---|---|---|
| 9,135,601 B2* | 9/2015 | Manry | | G06Q 50/01 |
| 2004/0267613 A1* | 12/2004 | Chan | | G06Q 30/02 |
| | | | | 705/14.67 |
| 2008/0040370 A1* | 2/2008 | Bosworth et al. | | 707/101 |
| 2008/0162260 A1* | 7/2008 | Rohan et al. | | 705/10 |
| 2008/0243607 A1* | 10/2008 | Rohan | | G06Q 30/0273 |
| | | | | 705/14.69 |
| 2009/0144075 A1* | 6/2009 | Flinn et al. | | 705/1 |
| 2009/0276453 A1* | 11/2009 | Trout | | G06Q 30/02 |
| 2010/0191598 A1* | 7/2010 | Toennis et al. | | 705/14.36 |
| 2011/0087534 A1* | 4/2011 | Strebinger et al. | | 705/14.25 |
| 2011/0184792 A1* | 7/2011 | Butcher et al. | | 705/14.13 |
| 2011/0191173 A1* | 8/2011 | Blackhurst et al. | | 705/14.49 |
| 2011/0320250 A1* | 12/2011 | Gemmell | | G06Q 30/02 |
| | | | | 705/14.16 |
| 2012/0084127 A1* | 4/2012 | Nkrumah | | G06Q 30/0213 |
| | | | | 705/14.15 |

(Continued)

OTHER PUBLICATIONS

United States Patent and Trademark Office, Before the Patent Trial and Appeal Board, U.S. Appl. No. 13/611,522, Nov. 2, 2017, ten pages.

*Primary Examiner* — Joe Chacko
(74) *Attorney, Agent, or Firm* — Fenwick & West LLP

(57) ABSTRACT

A social networking system allows users that are people to partner with users that are non-person entities. A partnership allows the entity participating in the partnership to personalize an associated page with content from the person participating in the partnership and similarly allows the person to include certain content from the entity, made available because of the partnership, in the person's user profile. The entity may provide additional benefits, such as enrollment in a rewards program or access to new products, to a user participating in a partnership. The partnership is bidirectional, and is separate from other unidirectional connection mechanisms provided by the social networking system such as indications of affinity (e.g., "likes"), friendships, and subscriptions.

22 Claims, 4 Drawing Sheets

(56) References Cited

U.S. PATENT DOCUMENTS

| | | | |
|---|---|---|---|
| 2012/0136852 A1* | 5/2012 | Geller | 707/722 |
| 2013/0254305 A1* | 9/2013 | Cheng | H04L 51/32 709/206 |
| 2013/0254716 A1* | 9/2013 | Mishra | 715/810 |
| 2013/0290337 A1* | 10/2013 | Lansford et al. | 707/738 |
| 2013/0297454 A1* | 11/2013 | Eronen | G06Q 30/06 705/26.61 |
| 2014/0006129 A1* | 1/2014 | Heath | 705/14.23 |
| 2014/0019544 A1* | 1/2014 | Palmert | 709/204 |
| 2014/0025735 A1* | 1/2014 | Garcia-Martinez | G06Q 30/0251 709/204 |
| 2014/0040030 A1* | 2/2014 | Winters | G06Q 30/0261 705/14.58 |
| 2014/0067964 A1* | 3/2014 | Grishaver et al. | 709/206 |
| 2014/0074620 A1* | 3/2014 | Bosworth et al. | 705/14.66 |

* cited by examiner

USER SELECTED AFFILIATION WITH BRANDS IN A SOCIAL NETWORKING SYSTEM

BACKGROUND

This application relates generally to social networking systems and, in particular, to distributing messages and advertisements to social networking system users based on connections between social networking system users.

Social networks that track and enable connections between users (including people, as well entities such as businesses), have become prevalent in recent years. In particular, a social network system allows users to more efficiently communicate information relevant to other social networking system users to which they are connected. Typically, social networking systems maintain connections among their users and allow express or implied identification of content that is interesting and relevant to individual users. Social networking systems also collect and maintain information about their users. This information may be static, such as geographic location, employer, job type, age, music preferences, interests, and a variety of other attributes, or it may be dynamic, such as tracking a user's actions within the social network.

Users can take advantage of the information maintained in the social networking system. For example, different users may configure presentation of their corresponding user profiles to control how their identity is presented to other social networking system users. User profiles are limiting, however, in that they treat different types of users the same. Specifically, although both persons and entities (such as businesses) are users, each may wish to express their own identities in the social networking system in different ways.

Existing social networking systems delineate between person users and entity users in simplistic ways. For example, conventional social networking systems may have different designs for user profiles for persons vs. entities. Hence, current social networking systems do not leverage connections between persons and entities in a meaningful way.

SUMMARY

A social networking system allows users that are people to partner or otherwise express an interest in or affiliation with users that are non-person entities. The partnership allows both users that are persons (for sake of clarity, referred to "persons") and users that are non-person entities (for clarity, referred to as "entities") to customize the presentation of their respective profiles and pages to other social networking system users, allowing persons and entities to differently convey their identities in the social networking system. The partnership also grants different benefits to persons and entities. The partnership may be bidirectional and separate from any other unidirectional connection mechanisms provided by the social networking system, such as indications of affinity (e.g., "likes"), friendships, and subscriptions.

In one embodiment, a partnership between a person and an entity provides the person with enhanced interactions with the social networking system. For example, the person in the partnership is provided access to social networking system content associated with the entity that is inaccessible to persons in the social networking system who are not partnered with the entity. For example, a user named Joe may accept a partnership with NIKE®. Accordingly, Joe may be granted access to image, video, and audio media content from NIKE® that is not available for presentation to users that are not partnered with NIKE®. Joe may also include this content in a visual representation of his user profile that is displayed by the social networking system. For example, Joe may change a graphic on his user profile to be a NIKE® logo that is provided only to users who have a partnership with NIKE®. More generally, if a person establishes a partnership with a brand, the person can alter presentation of their user profile to display a clear affiliation with the brand.

Partnership may also provide a person with rewards from an entity with which the user establishes a partnership, such as access to an entity's loyalty (or rewards) program. A reward from an entity may provide the person in the partnership with discounted or free goods or services from the entity. A rewards program may also provide the person with access to an otherwise restricted webpage associated with the entity that may be maintained by the social networking system, or maintained externally to the social networking system.

A partnership may also benefit the entity by allowing them to modify the visual presentation of a page associated with the entity to prominently present their partnerships with individual persons. Referring to the example above, NIKE® may modify the display of an associated page to indicate that they have partnered with Joe. This allows the entity's presence in the social networking system to be displayed based on users partnered with the entity.

Partnership may also allow an entity to preferentially advertise to users associated with them through partnerships. For example, if Joe is partnered with NIKE®, NIKE's advertisements have an increased likelihood of being displayed to Joe relative to advertisements by other entities with which Joe is not partnered. Thus, if Joe visits a particular webpage internal to or external to the social networking system, ads appearing on that web page have an increased likelihood of being associated with NIKE® as a result of the partnership. Further, an entity may also receive preferential treatment for advertisements presented to other users connected to a user that is partnered with the entity. In one embodiment, a social networking system accounts for a partnership between a user and an entity when selecting advertisements for presentation to other users connected to the user. Advertisements associated with the entity having the partnership with the user are more likely to be selected for presentation to other users connected to the user. For example, if Jane, who is friends with Joe, is to be presented an advertisement for running shoes, then an advertisement for NIKE® specifically mentioning Joe is more likely to be selected than it would be absent the partnership.

In one embodiment, the partnership is established when a person in the social networking system expressly provides the social networking system with a partnership request for the entity, which is accepted by the entity to establish the partnership. Partnerships may be freely submitted and accepted, or limited in number or scope. Further, partnerships may be suggested by the social networking system based on the actions of a user logged by the social networking system. Additionally, partnerships may also be suggested by the entity to persons, such as persons meeting requirements set forth by the entity.

The features and advantages described in this summary and the following detailed description are not all-inclusive. Many additional features and advantages will be apparent to one of ordinary skill in the art in view of the drawings, specification, and claims hereof.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

User Initiated Partnerships in a Social Networking System

Figure 1:
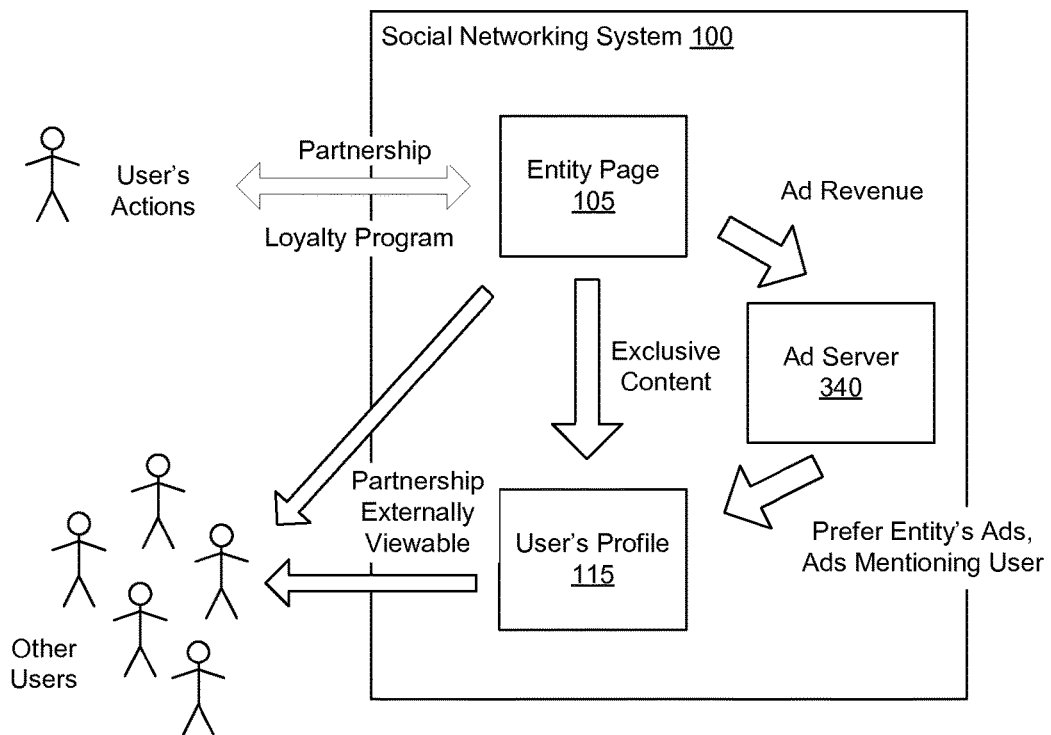
FIG. 1 is an event diagram illustrating partnerships between persons and entities in a social networking system, according to one embodiment.

FIG. 1 is an event diagram illustrating partnerships between persons and entities in a social networking system, according to one embodiment. The social networking system 100 allows its users to establish connections with each other. Further, the social networking system 100 allows users that are people (for clarity, referred to herein as "persons") and users that are non-person entities (referred to as "entities" herein for clarity) to establish partnerships with each other. Unlike other types of connections formed between social networking system users, such as such as friendships or expressions of affinity, partnerships provide the people and/or entities participating in them with additional or different benefits that are not available to other social networking system users.

In the example of FIG. 1, a partnership has been formed between a user and an entity in the social networking system. To form the partnership, the person communicates a partnership request to the entity via the social networking system 100, and the entity accepts the partnership request. Persons may initiate formation of a partnership or the social networking system 100 may suggest partnerships to persons based information about the persons stored by the social networking system 100, such as logged actions or data in a user profile associated with a person. Additionally, entities themselves may suggest partnerships to persons via the social networking system 100.

For entities that are businesses selling brands of goods and/or services, a partnership may also be referred to as the selection of a "top brand" by the person in the partnership. For example, a company may maintain several entities in the social networking system, each associated with a different brand. A person's selection of a "top brand" is a partnership with the entity for that brand. Hence, establishing a partnership with an entity associated with a brand allows a person to configure presentation of their user profile 115 by the social networking system to identify to identify the "top brand" selected by the user via the partnership. For example, selecting "top brands" allows a person to provide an illustration of their lifestyle to other social networking system users by expressing preferences for brands. Hence, a person selecting a "top brand" allows a person to modify presentation of their "identity" by the social networking system, by allowing the entity corresponding to the selected "top brand" to be identified in the person's user profile 115.

Each partnership grants benefits to both the person and the entity in the partnership. In exchange for entering into the partnership, a person receives one or more rewards or benefits from the entity. For example, the person is granted access to exclusive items of media content created by the entity. The person may select one or more of these items to be visually displayed with their identity in the social networking system 100. For example, the person may alter their user profile 115 to display, or to more prominently display, items of media content selected from the exclusive items created by the entity partnered with the person in their user profile 115. This allows the person in a partnership with an entity to modify a displayed representation of their user profile 115 to highlight the partnership with the entity. For example, if the person is partnered with NIKE®, inclusion of a NIKE® logo in their user profile 115 allows display of a representation of the user profile 115 to leverage mental associations other users are believed to have with respect to NIKE® when those other users view the representation of the user profile 115. A person may receive other types of rewards or benefits from the entity because of the partnership. Examples of other rewards provided to a person include providing the person with access to coupons for free or discounted goods or services by the entity, early access to new goods or services by the entity or access to rewards programs offered by the entity.

The entity included in a partnership also receives benefits from the person included in the partnership. For example, an entity in a partnership with a user may be enabled to include content from the person's user profile on a page associated with the entity. For example, the entity 105 may be granted permission to display the person's user profile picture on the page associated with the entity. Thus, the entity may modify presentation of its identity presented the social networking system 100, such as a page associated with the entity (an entity page 105), by including information about persons with which it is partnered on the page associated with the entity. Additionally, advertisements associated with an entity with which a person is partnered may be preferentially displayed to the person and/or to other persons connected to the person partnered with the entity.

In addition to benefitting the person and the entity included in a partnership, the social networking system 100 may receive benefits from the partnership. These benefits may include, for example, advertising revenue paid by an entity, a charge per partnership paid by an entity, or a subscription fee paid per person. For example, the entity may compensate the social networking system 100 when a partnership with a person is established or when a partnership suggested by the social networking system 100 to a person is established. In the case of advertising revenue, advertising revenue may be collected from an entity as a result of an advertisement server ("ad server") 340 selecting advertisements with increased likelihood of selecting advertisements from the entity being presented to a person partnered with the entity or being presented to persons connected to the person partnered with the entity. As another example, the advertisement server 340 may suggest a partnership to an entity based on compensation from the entity and an affinity between a user and the entity. For example, affinities between a user and entities are calculated and the affinities are used along with compensation received from the entities are used by the social networking system 100 to suggest an entity for partnering with the user.

Network including a Social Networking System

Figure 2:
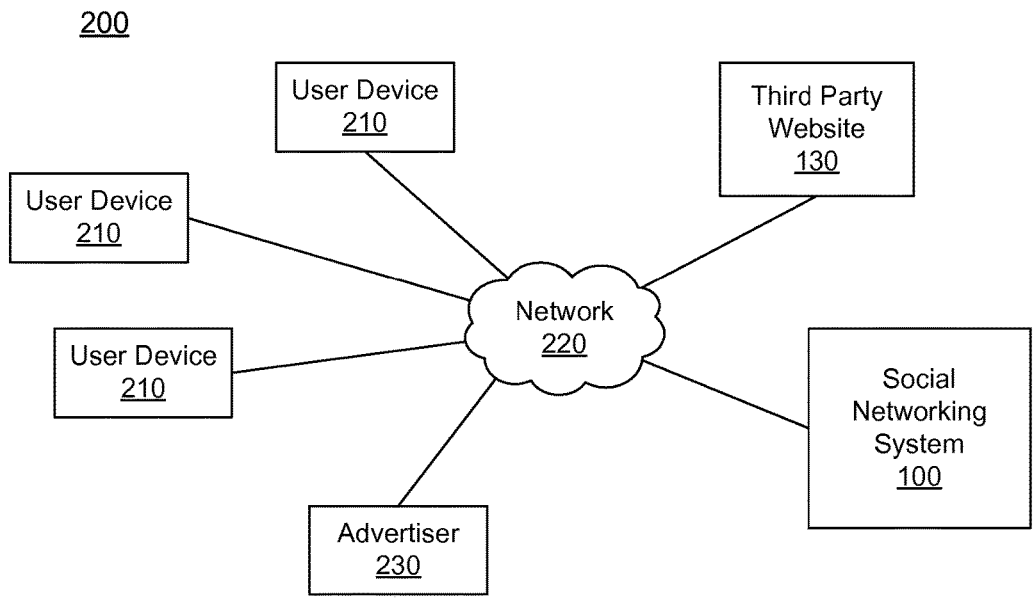
FIG. 2 is a network diagram of a network including a social networking system, according to one embodiment.

FIG. 2 is a network diagram of one embodiment of a system environment 200 including a social networking system 100. The system environment 200 includes one or more user devices 210, the social networking system 100, one or more third party websites 130, one or more advertisers 230, and a network 220. In alternative configurations, different and/or additional components may be included in the system environment 200.

A user device 210 comprises one or more computing devices capable of receiving user input as well as transmitting and/or receiving data via the network 220. In one embodiment, a user device 210 is a conventional computer system, such as a desktop or laptop computer. In another embodiment, a user device 210 may be a device having computer functionality, such as a personal digital assistant (PDA), mobile telephone, smart-phone or similar device. A user device 210 is configured to communicate via the network 220. In one embodiment, a user device 210 executes an application allowing a user of the user device 210 to interact with the social networking system 100. For example, a user device 210 executes a browser application to enable interaction between the user device 210 and the social networking system 100 via the network 220. In another embodiment, a user device 210 interacts with the social networking system 100 through an application programming interface (API) that runs on the native operating system of the user device 210, such as IOS® or ANDROID™.

The user devices 210 are configured to communicate via the network 220, which may comprise any combination of local area and/or wide area networks, using both wired and wireless communication systems. In one embodiment, the network 220 uses standard communications technologies and/or protocols. Thus, the network 220 may include links using technologies such as Ethernet, 802.11, worldwide interoperability for microwave access (WiMAX), 3G, 4G, CDMA, digital subscriber line (DSL), etc. Similarly, the networking protocols used on the network 220 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 220 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec). One or more third party websites 130 and/or advertisers 230 may be coupled to the network 220 for communicating with the social networking system 100.

The social networking system 100 comprises one or more computing devices storing data describing a social network that includes a plurality of users and provides users of the social network with the ability to communicate and interact with other users of the social network. According to various embodiments, the social networking system 100 may comprise one or more servers accessible through a wired or wireless network 220 by user devices 210. In use, users join the social networking system 100 and then add connections (i.e., friendships, subscriptions, fans) to other users or objects of content of the social networking system 100 to whom they desire to be connected. Connections may be added explicitly by a user or may be automatically created by the social networking system 100 based on common characteristics of the users (e.g., users who are alumni of the same educational institution). For example, a first user specifically selects a particular other user to be a friend.

Connections between users of the social networking system 100 are usually bilateral, or "mutual," but connections may also be unilateral, or "one-way." For example, if Bob and Joe are both users of the social networking system 100 and connected to each other, Bob and Joe are each other's connections. If, on the other hand, Bob wishes to connect to Joe to view data communicated to the social networking system 100 by Joe but Joe does not wish to form a mutual connection, a unilateral connection may be established. The connection between users may be a direct connection; however, some embodiments of a social networking system 100 allow the connection to be indirect via one or more levels of connections or degrees or separation. Using a social graph, therefore, the social networking system 100 may keep track of many different types of users and objects and the interactions and connections between them, thereby maintaining a rich store of socially relevant information.

The social networking system 100 enables users to interact with each other as well as with objects of content. In one embodiment, the social networking system 100 associates an object with metadata identifying content included in the object. In addition to establishing and maintaining connections between users and enabling interactions between users and objects, the social networking system 100 allows its users to take actions on various types of information stored in the social networking system 100, such as user profiles, events, comment posts, or other suitable information. The social networking system 100 is further described below in conjunction with FIG. 3.

An advertiser 230 bid for the presentation of sponsored stories by the social networking system 100. The advertisers 230 is a type of entity that may have a presence in the social networking system 100 by maintaining one or more pages associated with the entity (or "entity pages"). In one embodiment, the social networking system 100 receives advertisement requests ("ad requests") from the advertiser 230 including an identification of the content to be presented to users and a bid amount specifying the amount the advertiser 230 will pay the social networking system 100 for presenting the identified content. The social networking system 100 may provide advertisers 230 with a web interface to easily provide ad requests to the social networking system 100.

Social Networking System Architecture

Figure 3:
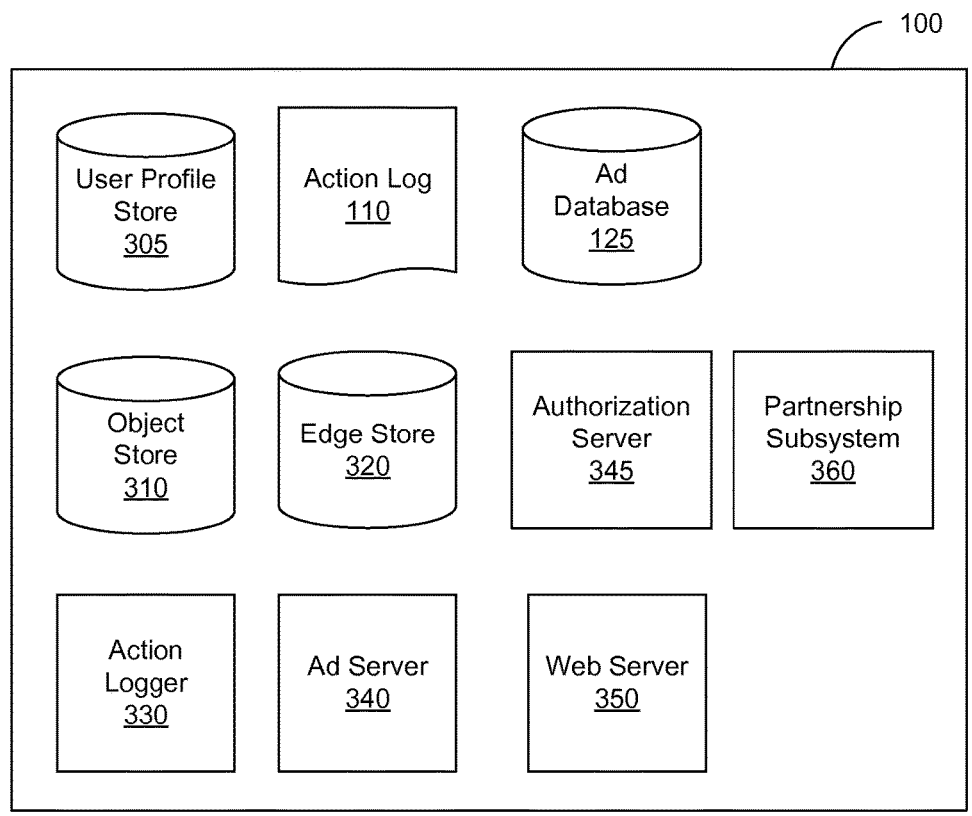
FIG. 3 is a block diagram of a social networking system, according to one embodiment.

FIG. 3 is a block diagram of one embodiment of a social networking system 100. The embodiment of a social networking system 100 shown by FIG. 3 includes a user profile store 305, an object store 310, an edge store 320, an action logger 330, an action log 110, an ad server 340, an ad database 125, an authorization server 345 a web server 350, and a partnership subsystem 360. In other embodiments, the social networking system 100 may include additional, fewer, or different components. Conventional components such as network interfaces, security mechanisms, load balancers, failover servers, management and network operations consoles, and the like are not shown so as to not obscure the details of the system.

Users, such as persons and entities, in the social networking system 100 are associated with their own user profile 115, which is stored in the user profile store 305. A user profile 115 includes declarative information about a user that was explicitly provided by the user, and may also include profile information inferred by the social networking system 100. In one embodiment, a user profile 115 includes multiple data fields, each data field describing one or more attributes of the corresponding user of the social networking system 100. Attributes described in a user profile 115 include biographic, demographic, and other types of descriptive information, such as work experience, educational history, gender, hobbies or preferences, location and the like.

A user profile 115 may also store other information, for example, items of media content such as images or videos. In certain embodiments, images of persons may be tagged with identification information. Further examples of information that may be included in a user profile 115 include anything a user can add, upload, send, or "post," to the social networking system 100. For example, a user communicates posts to the social networking system 100 from a user device 210. Posts include data such as status updates or other textual data, location information, photos, videos, links, music or other similar content and are associated with the user profile of the posting user. A user profile 115 in the user profile store 305 may also maintain references to actions by the corresponding person performed on objects in the object store 310 and stored in the action log 330.

The social networking system 100 maintains data about a number of different types of objects with which a user may interact. The object store 310 stores a data structure including data for each object maintained by the social networking system 100. The data structures comprise information fields that may be different depending upon the type of the object. For example, for event type objects, the object store 310 includes data structures specifying the time and location for an event. When a new object of a particular type is created, the social networking system 100 initializes a new data structure of the corresponding type, assigns a unique object identifier to it, and adds data to the data structure as needed. For example, if a user defines a new event the social networking system 100 generates a new instance of an event in the object store 310, assigns a unique identifier to the event, and populates the fields of the event with information provided by the user.

The object store 310 is also configured to store entity pages 105. An entity page 105 comprises content associated with an entity and instructions for presentation of the content to a social networking system user. For example, an entity page 105 identifies content associated with the entity's user profile as well as information describing how to present the content to users viewing the brand page. The object store 310 may also store one or more targeting criteria that associated with each content item in the store. The targeting criteria identify one or more characteristics of a user to whom a content item is to be delivered.

Examples of information included in objects include major life events such as graduation, marriage, or the birth of a child, as well as other events such as changes in user location, check-ins, comments on other items in the social networking system, tags to photos and other day to day occurrences. Objects also include information not directly related to particular users. For example, an object may describe Paris, France and may have a picture of the Eiffel Tower uploaded by a user. These are just a few examples of the information making up the objects of a social networking system, with many others possible.

Objects may also be associated with metadata to simplify use of the objects by the social networking system 100. Metadata may also be included as tags in objects to link objects together based on similarity of content. In one embodiment, metadata comprises text descriptors for nouns, for example actual things, ideas, or concepts that have meaning For example, "Inspector Gadget," "rowing," "sociology," and "comedy" are examples of metadata. In some embodiments, each object in the object store 310 is associated with one or more items of metadata. For example, if an object discussed the city of Santa Cruz, Calif., it may include metadata items for UCSC, surfing, California, ocean, beach, etc. Multiple objects may share metadata with each other, allowing a viewing user to easily transition between related objects using the metadata.

The action logger 330 receives communications about user actions on and/or off the social networking system 100 and populates the action log 110 with information about user actions. Such actions may include, for example, adding a connection to another user, sending a message to another user, uploading an image, reading a message from another user, viewing content associated with another user, attending an event posted by another user, among others. In some embodiments, the action logger 330 identifies interaction between a social networking system user and a brand page within the social networking system 100, which may communicate data, such as targeting criteria, used to customize content from the brand page. For example, the action logger 330 receives a communication that a person has established a partnership with a brand page, allowing the content presented by the brand page to include data associated with the person establishing the partnership. In addition, a number of actions described in connection with other objects are directed at particular users, so these actions are associated with those users as well. These actions are stored in the action log 110.

The action logger 330 may also store user actions taken on external websites in the action log 110. For example, an e-commerce website that primarily sells sporting equipment at bargain prices may recognize a user of a social networking system 100 through social plug-ins that enable the e-commerce website to identify the user of the social networking system 100. Because users of the social networking system 100 are uniquely identifiable, e-commerce websites, such as this sporting equipment retailer, may use the information about these users as they visit their websites. The action logger 330 receives data about these users, including web-page viewing histories, advertisements that were engaged, purchases made, and other patterns from shopping and buying. The received data is communicated to the action log 110 for storage.

The social networking system 100 further stores data describing one or more connections or other relationships between different users in an edge store 320. The connection information may indicate users who have similar or common work experience, group memberships, hobbies, educational history, or are in any way related or share common attributes. Additionally, the edge store 320 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed.

The edge store 320 includes data structures describing a user's connections to other users and/or connections to objects. The edge store 320 may also associate a connection type with a user's connections, which may be used in conjunction with the user's privacy setting, to regulate access to information about the user. For example, the edge store 320 stores a type, or other data, identifying connections between a person and an entity that form a partnership. In addition, the edge store 320 may be accessed by other aspects of the social networking system 100.

Data stored in the user profile store 305, the object store 310, the edge store 320 and/or the action log 110 allow the social networking system 100 to maintain a "social graph," which includes a plurality of nodes that are interconnected by a plurality of edges. Each node in the social graph represents an object in the social networking system 100 that can act on and/or be acted upon by another node. Common examples of nodes include user profiles, entity pages, media content, groups, events, messages, categories, concepts, and any other data that can be represented by the social networking system. An edge between two nodes in the social graph represents a particular kind of connection between the two nodes, which may result from an action that was performed by one of the nodes on the other node. For example, an edge between a person's user profile and an entity's user profile represents a partnership between the person and the entity.

The ad server 340 provides advertisements from the ad request database 125 for display to users. The ad server 340 also manages interactions between one or more advertisers 230 and the social networking system 100. For example, the ad server 340 manages a bidding process which advertisers 230 use to purchase advertising space from the social networking system 100, as well as the ranking and selection process used to determine which advertisements are displayed to users. Advertising space, may include, for example, space in the user profile 115 or in a newsfeed displayed by the social networking system 100. In one embodiment, the ad server 340 determines the price of advertisement based on the expected value to the social networking system 100 of the advertising space to be provided. The expected value may be determined by multiplying a bid amount associated with the advertisement by a probability that a user will access or interact with the advertisement. As another example, the bid amount is the expected value.

The authorization server 345 enforces one or more privacy settings of the users of the social networking system 100. A privacy setting of a user determines how particular information associated with a user can be shared. In one embodiment, a privacy setting specifies particular information associated with a user and also specifies objects with which the specified information may be shared. Examples of objects specified by a privacy setting include users, applications, advertisers, external websites or any object that can potentially access the information. Examples of information associated with a user specified by a privacy setting include user profile information like profile picture, phone numbers associated with a user, email addresses associated with the user, user's connections, actions taken by the user such as adding a connection, changing user profile information and the like. Privacy settings allow users to regulate access to information associated with the users by other objects associated with the social networking system 100.

The web server 350 links the social networking system 100 via the network 220 to the one or more user devices 210, as well as to the one or more third party websites 130 and/or advertisers 230. The web server 350 serves web pages, as well as other web-related content, such as JAVA®, FLASH®, XML and so forth. The web server 350 may provide the functionality of receiving and routing messages between the social networking system 100 and a user device 210. Examples of messages include instant messages, queued messages (e.g., email), text and SMS (short message service) messages, or messages sent using any other suitable messaging technique. A user may send a request to the web server 350 to upload information, for example, images or videos that are stored in the object store 310. Additionally, the web server 350 may provide application programming interface (API) functionality to send data directly to native client device operating systems, such as IOS®, ANDROID™, WEBOS® or RIM.

The partnership subsystem 360 manages the formation of partnerships between persons and entities in the social networking system 100. Additionally, the partnership subsystem 360 may suggest potential partnerships to a person based on data associated with the person in the user profile store 305, in the object store 310, in the edge store 320 and/or in the action log 110. The partnership subsystem 360 also controls access to content items of entities and/or persons that are accessible based on the establishment of a partnership. The partnership subsystem 360 also communicates data describing a partnership to an entity, allowing the entity to provide rewards to a user having a partnership with the entity. Data from the entity for selection and presentation of advertisements based on a partnership is received by the partnership subsystem 360 and communicated to the ad server 340. The partnership subsystem 360 is described more fully below.

Forming a Partnership between a Person and an Entity in the Social Networking System A partnership is formed when a person submits a partnership request to an entity via the social networking system 100, and the entity accepts the partnership request via the social networking system 100. The partnership subsystem 360 is configured to present the person with the opportunity to submit a partnership request in a variety of ways while accessing the social networking system 100. For example, the partnership subsystem 360 provides an interface allowing a user to submit a partnership request while accessing the user's profile 115, a newsfeed, individual advertisements for the entity, and/or the entity page 105.

For example, a user may be viewing the profile page associated with NIKE within the social networking system. A box, icon, or link may be displayed on the NIKE profile page, which when interacted with brings up a separate user interface for submitting a partnership request to NIKE from the entity. The partnership request may require some information to be input by the user and/or may be automatically filled out based on information known about the user by the social networking system.

The partnership subsystem 360 may impose restrictions on a person's or an entity's ability to create a partnership. In one implementation, persons are only allowed to partner with a threshold number of entities, so the partnership subsystem 360 maintains a running count of the number of entities with which a person is partnered and compares the running count to the threshold number. The running count is incremented each time the person enters into a partnership and the partnership subsystem 360 allows creation of the partnership if the running count does not exceed the threshold number of entities. In another implementation, entities are only allowed to partner with a limited number of persons, so the partnership subsystem 360 may maintain a similar running count of the persons in a partnership with the entity that is compared to a person threshold when establishing a partnership. Other suitable mechanisms may be used by the partnership subsystem 360 to limit or regulate creation of partnerships.

Additionally, entities themselves may limit establishment of partnerships with various persons. For example, an entity may establish a partnership with a person satisfying criteria specified by the entity but not establish partnerships with persons that do not satisfy the criteria. The entity may allow its criteria for establishing a partnership to be publicly accessible or may keep the criteria kept private. These criteria may be built into automated processing logic for the entity determining whether to accept a person's partnership request. Alternatively, the entity may provide criteria to the partnership subsystem 360 and an instruction to prevent a person from submitting a partnership request unless the person meets the specified criteria.

Although partnerships are initiated by persons, both the social networking system 100 and entities may suggest possible partnerships to persons. The partnership subsystem 360 may analyze actions taken by a person and stored in the action log 110 and/or a person's user profile from the user profile store 305 to determine entities with which the user may have an interest in establishing a partnership. The partnership subsystem 360 may base its determination on what partnerships to suggest to which users based on real world location data using check ins, ecommerce purchase information, and social information regarding the interactions between a user and other users and/or entities within the social networking system (e.g., based on what the users likes, posts, and views within the social networking system).

In one implementation, the partnership subsystem 360 determines an affinity score between the person and one or more entities. An affinity score provides a measure of connectedness between objects stored by the social networking system 100, so the partnership subsystem 360 may use the affinity scores between objects in the social networking system associated with users and entities to measure the strength of connection between them. Generally, the higher the affinity score, the greater the connectedness between the entity and the person, making it more likely that the person will be interested in the entity. The partnership subsystem 360 may rank one or more entities based on their affinity score with a person and suggest one or more of the top ranking entities to the person for partnership. The partnership subsystem 360 may account for additional information when suggesting partnerships. For example, the social networking system 100 may receive compensation from entities and account for this compensation as well as the affinities between entities and a person when suggesting partnerships for the person.

For example, a user who is physically located in a real world coffee shop such as a STARBUCKS location may interact with STARBUCKS through the social networking system using a mobile application on a mobile device. For example, the user may check in at the STARBUCKS physical location, like or otherwise express affinity for the STARBUCKS brand, mention the brand in a post, or interact in some other way. Responsive to monitoring one of these actions, the social networking system may send the user a partnership request for the user to form a partnership with STARBUCKS. This request may also be based, in part, on an affinity score between the user and STARBUCKS as described above.

Further detail regarding the determining the affinity, or level of closeness, between any two things in the social networking system (e.g., between objects associated with a user and objects associated with an entity) is described in U.S. patent application Ser. No. 13/149,804, titled "Contextually Relevant Affinity prediction in a Social Networking System," which was filed on Dec. 23, 2010, and is incorporated herein by reference in its entirety.

The affinity score between an entity and a person may be based on individual affinity scores between objects from the object store 310 associated with the person and objects from the object store 310 associated with the entity. In one embodiment, the affinity score between two objects is a function of the number of degrees of separation across the social graph between the two objects as stored by the edge store 320 and is also a function of the level of affinity between the two objects, as expressly or inherently determined from the actions, from action log 110, of any user connected with the object. Generation of an affinity score between objects in the social networking system 100 is further described in U.S. application Ser. No. 12/978,265, filed on Dec. 23, 2010, which is hereby incorporated by reference in its entirety.

Individual entities may also suggest partnerships to individual persons. The partnership subsystem 360 may analyze actions taken by and/or user profile information associated with persons to determine persons that are likely candidates for establishing a partnership with the entity. In one implementation, the partnership subsystem 360 calculates affinity scores between the entity and a plurality of different persons and ranks the persons based on their affinity scores. One or more of the top ranked persons may be identified to the entity as candidates for establishing a partnership.

When a partnership is created between a person and an entity, the social networking system 100 associates the person with the entity and also associates the entity with the person. In one embodiment, the partnership is stored as a connection between the person's user profile and the entity's user profile in the edge store 320 having a connection type indicating a partnership. Alternatively, the partnership is stored by storing in the edge store 320 a connection between the person's user profile 115 and the entity page 110. Unlike other types of connections stored by the social networking system 100, partnerships are bidirectional.

Partnerships are separate from other types of connections that may be formed between persons, entities, and their respective objects in the social networking system 100. A partnership between a person and an entity is maintained in addition to other connections between the person and the entity. For example, the social networking system 100 allows a person to express affinity towards another person (e.g., likes, fan), allows a person subscribe to another person's created content (e.g., subscriptions), allows a person to connect directly with another person or with an entity (e.g., become friends), and separately allows a person and entity to partner.

Benefits of a Partnership for a Person in a Social Networking System

Establishing a partnership with an entity provides benefits to a person. For example, partnering with an entity provides a person with access to exclusive items of media content associated with the entity in the social networking system 100 that are not available to non-partners. Persons may present these media content items in a representation of their user profile 115 by the social networking system 100 and/or proximate to other social networking system objects maintained by the persons, allowing their online identity to leverage an established partnership.

The items of media content accessible to a person based on establishment of a partnership may include images, videos, audio recordings, text content, or generally any type of content that can be uploaded, sent, or posted by the social networking system 100. Items of media content may also be associated with objects stored in the object store 310 to simplify their user by persons in a partnership. Examples of images include brand or product images, trademarked brand logos, and pictures from events sponsored by the entity.

Examples of videos include product marketing videos, consumer generated short clips, and video records of events sponsored by the entity. Examples of audio recordings include songs, ringtones, interviews and concert recordings.

The person included in a partnership may control presentation of media content items to which they have been provided access within content provided by the social networking system 100. Generally, a user may elect to display media content items proximate to any object maintained by the social networking system 100 over which the person has control. The media content items may displace other media content previously displayed in the selected display location. For example, the media content items may be displayed in a person's user profile 115, in a newsfeed story created by the person, in a newsfeed story related to the person or in any other object relating to the person. In specific implementations of a social networking system 100, the items of media content may be displayed in a timeline generated for a person, in frames including data associated with the person, in messages or notifications associated with the person or other information associated with the person.

The media content may be displayed in a number of different manners. For example, if a partnered user has a partnership with NIKE, when another user views the partnered user's user profile, NIKE advertisements may be displayed in place of regular advertisements. Similarly, the user's background timeline photo may be a NIKE advertisement provided exclusively to partners.

In one implementation, the media content items provided by the entity to the person are higher-resolution and/or higher-quality media content items than those accessible by persons not participating in a partnership. For example, all users may be granted access to an icon such as NIKE® logo, while a person in a partnership with NIKE® is granted access to a full page "splash" logo covering a larger portion of the displayed social networking system 100 interface. This access to higher-resolution or higher-quality media content items allows the person to more prominently identify its association with the entity providing the media content items when a representation of the person's user profile is displayed. Providing access to improved quality media content items provides the partnered person with more options for configuring presentation of a representation of their user profile 115. For example, a user partnered with NIKE® may customize a cover image displayed when a page associated with the person is viewed to be an exclusive increased sized NIKE® specially created for use as a cover photo.

Entities may also provide partnered persons with rewards for participating in the partnership. These rewards provide additional incentives for a person to establish a partnership with an entity. For example, an entity provides a person in a partnership with such as coupons for discounted (or free) goods or services, access to rewards programs such as customer loyalty programs (e.g., frequent flier programs), access to limited-time or limited-edition goods or services, access to earlier opportunities to purchase products or services or other benefits. Reward programs or other rewards may be associated with websites external to the social networking system 100, such as one or more third-party websites 130. For example, when a partnership is established, the entity may provide the person in the partnership with a code or other login credentials granting access to the rewards program and/or to the external website.

Figure 4:
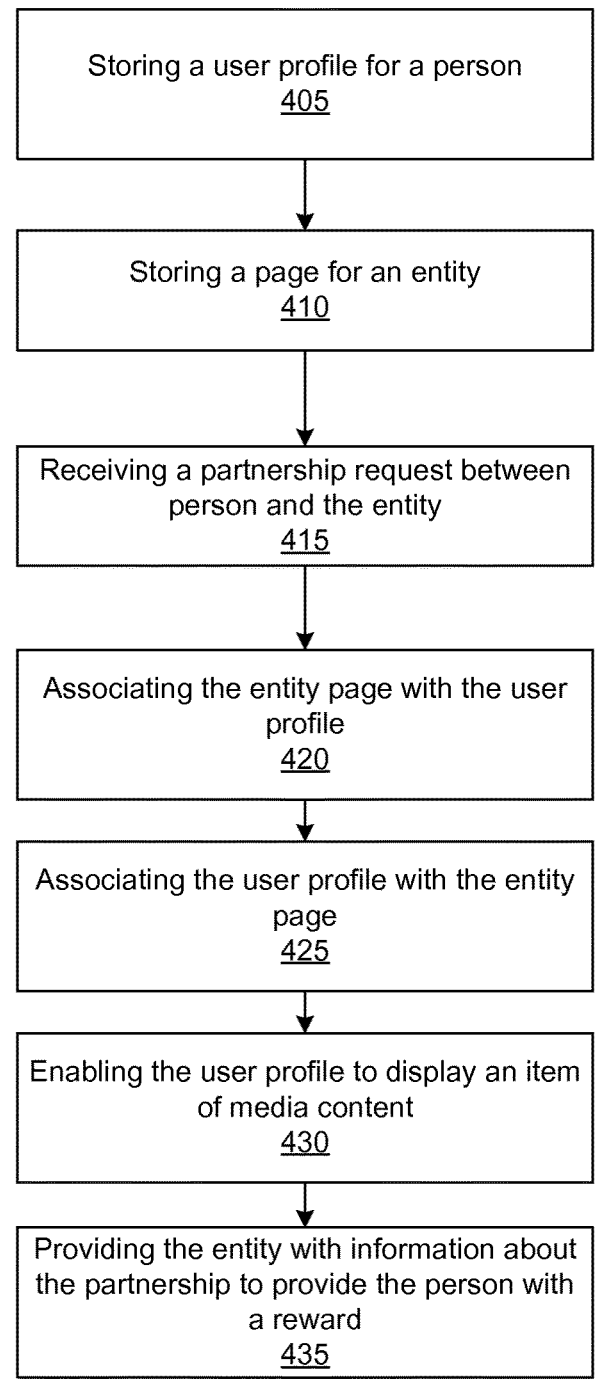
FIG. 4 is a flow chart of a process for creating partnerships between a person and an entity in a social networking system providing benefits to the person, according to one embodiment.

FIG. 4 is a flow chart of an embodiment of a process 400 for creating a partnership between a person and an entity in a social networking system 100 providing benefits to the person. The social networking system 100 stores 405 a user profile 115 for the person. The user profile 115 includes data describing the person and is connected with one or more objects stored by the social networking system 100. Similarly, the social networking system 100 stores 410 an entity page 105 associated with an entity. The entity page 105 includes content associated with the entity as well as data describing the entity. Additionally, the entity page 105 is connected with one or more objects stored in the social networking system 100. The objects connected with the entity page 105 and the objects connected with the user profile may partially overlap, fully overlap or be entirely distinct.

The social networking system 100 receives 415, from a person associated with the user profile 115, a partnership request between the person and the entity. The social networking system 100 provides the partnership request to the entity identified by the partnership request and receives an acceptance or rejection of the partnership request from the entity. If the partnership request is rejected, the social networking system 100 may notify the person providing the partnership request. If social networking system 100 receives an acceptance of the partnership from the entity, the entity page 105 and/or the user profile associated with the entity is associated 420 with the person's user profile 115. For example, a connection between the entity page 105 and the person's user profile 115 is stored in the edge store 320. The person's user profile 115 is also associated with the entity page 105 and a connection between the person's user profile 115 and the entity page 105 is stored in the edge store 320.

Upon creation of the partnership, the social networking system 100 enables 430 objects associated with the person, such as their user profile 115, to display or otherwise present one or more exclusive items of media content that are unavailable to persons not in a partnership with the entity. This allows the person to modify a representation of its associated user profile 115 to include one or more of the items of media content provided by the entity The social networking system 100 may also provide 435 information describing the partnership to the entity, allowing the entity to provide the person with one or more rewards based on the partnership. As described above, examples of rewards include coupons for discounted (or free) goods or services, access to rewards programs such as customer loyalty programs (e.g., frequent flier programs), access to limited-time or limited-edition goods or services, access to earlier opportunities to purchase products or services.

Benefits of a Partnership for an Entity in a Social Networking System

An entity also receives benefits from establishing a partnership with a person in the social networking system 100. For example, the entity may be provided access to items of media content created by, or associated with, persons in the social networking system 100 that have established a partnership with the entity. The person may limit access to these media content items via one or more privacy settings so entities involved in a partnership with the person have access but not other social networking system users. For example, by accepting a partnership with a person, an entity may be provided with the option of using the partnered person's user profile photo in their entity page 105.

Entities make use of media content accessible via partnerships to customize appearance of an entity page 105, or other data associated with the entity, in the social networking system 100. For example, an entity providing a new product may populate its entity page 105 user profile photos of people partnered with the entity that have purchased or used the new product to better illustrate the varying demographics of persons interested in that product or the popularity of the product without making an overt advertisement illustrating those concepts. As this presentation of information is more organic, it may have greater effect in influencing social networking system users to purchase the new product.

Additionally, the social networking system 100 provides entities with prioritized presentation of their advertisements to persons partnered with the entity. This prioritization increases the likelihood that advertisements provided by the entity are selected for presentation to persons partnered with the entity relative to the likelihood that the entity's advertisements are selected for display to non-partnered persons.

In one implementation, the ad server 340 in the social networking system 100 receives a request for an advertisement for presentation to a social networking system user. The request for an advertisement may include criteria identifying users eligible to be presented an associated advertisement. The ad server 340 calculates scores for a number of advertisements, one or more of which the entity compensates the social networking system 100 for presentation to users. The score for an advertisement may be based on a variety of factors, such as the amount the entity has bid to present the advertisement, the relevance of the advertisement to the criteria, the number of the entity's advertisements that have been recently displayed to the person, the likelihood of the person accessing the advertisement, along with other factors. The advertisements under consideration are ranked based on their respective scores, and one or more of the highest ranked advertisements are selected by the ad server 340 for presentation to the user.

If the requesting user is a person partnered with an entity whose advertisements are under consideration, the scores of advertisements associated with the entity are increased so those advertisements have a higher ranking than they would without the increase. For example, scores of advertisements associated with the entity are increased by a specified amount if the entity is in a partnership with the person. Hence, advertisements associated with an entity partnered with the person may be ranked ahead of advertisements associated with entities that are not partnered with the person.

The social networking system 100 may also allow an entity to prioritize selection of its advertisements for presentation to persons that are not partnered with the entity but are connected to a person partnered with the entity. Thus, a partnership may also increase the likelihood that advertisements associated with the entity are presented to persons connected to a person partnered with the entity. Increasing the likelihood of presentation of an entity's advertisements to the persons connected to a person partnered with the entity may be implemented as described above.

If an advertisement is selected for presentation to a person partnered with a first entity, and the first person connected to another person that is partnered with a second entity, the "strength" of the partnerships with the first person may be used when selecting advertisements. For example, advertisements associated with the entity in a partnership with the first user may be selected before advertisements associated with the entity in a partnership with another user connected to the first user. In one embodiment, advertisements associated with the entity partnered with a user receive a larger increase in score than advertisements associated with entities not partnered with the user but partnered with other users connected to the user.

The prioritization of advertisements for entities partnered with users may be made use of within the context of the social networking system, for example, when a partnered user or another user connected with the partnered users views a particular page on the social networking system. Additionally, other webpages, servers, or websites making use of the social networking system can leverage partnerships when deciding what advertisements to show to users. For example, if a user on a third party website is known to the website via their social networking system identity, the third party website can use the user's partnerships to prioritize advertisements associated with partnered entities over other entities. This can occur using mechanisms such as iframes, social plugin applications, connect, etc. For example, if the user is viewing the NEW YORK TIMES website and has connected their social networking identity to the NEW YORK TIMES website, and further if the user is partnered with NIKE, when the user (or another user they are connected with through the social networking system) visits the NEW YORK TIMES website, NIKE ads may be preferentially displayed as compared to other advertisements.

Figure 5:
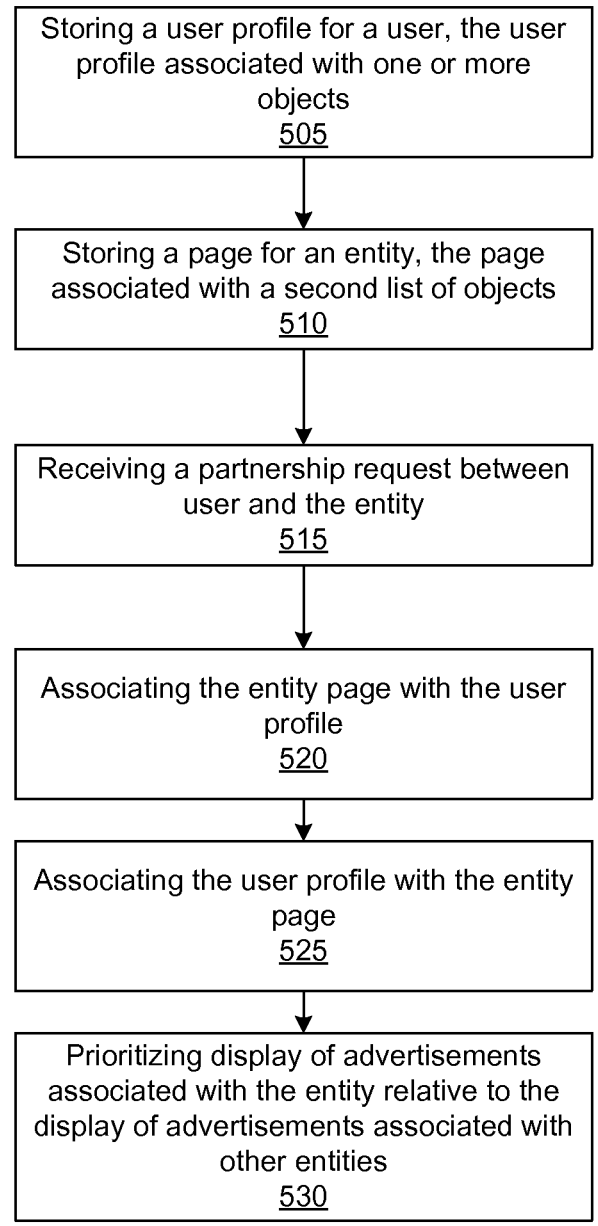
FIG. 5 is a flow chart of a process for creating partnerships between a person and an entity in a social networking system providing benefits to the entity, according to one embodiment.

FIG. 5 is a flow chart of an embodiment of a process 500 for creating partnerships between a person and an entity in a social networking system 100 where benefits are provided to the entity. Steps 505 through 525 of the process 500 are the same as steps 405 through 425 of the process described above in conjunction with FIG. 4 above and are not repeated here for clarity. When the partnership is created, the social networking system 100 prioritizes 530 presentation of advertisements associated with the entity in the partnership relative to presentation of advertisements associated with other entities, as described above.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, although the foregoing embodiments have been described in the context of a social network website, it will apparent to one of ordinary skill in the art that the invention may be used with any electronic social network service, even if it is not provided through a website. Any computer-based system that provides social networking functionality can be used in accordance with the present invention even if it relies, for example, on e-mail, instant messaging, or other form of electronic communications, and any other technique for communicating between users. The invention is thus not limited to any particular type of communication system, network, protocol, format or application.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible, non-transitory computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    storing, in a social networking system, a user profile for a person, the user profile associated with one or more user objects stored by the social networking system;
    storing, in the social networking system, an entity page associated with a non-person entity user, the entity page associated with one or more entity objects stored by the social networking system;
    receiving, by the social networking system, a partnership request to establish a partnership between the person and the entity user;
    receiving, from the entity user, a confirmation to establish the partnership between the person and the entity user; and
    responsive to receiving the confirmation to establish the partnership and throughout the duration of the partnership:
        automatically modifying the user profile page to display an item of media content associated with the entity user;
        displaying the modified user profile page including the item of media content associated with the entity user to one or more users of the social networking system;
        automatically modifying the entity page to include a user object of the one or more user objects associated with the user profile, the user object at least in part related to the entity user; and
        displaying the modified entity page to one or more users of the social networking system.

2. The method of claim 1, further comprising:
    providing, to the entity user, information about the partnership between the person and the entity user, wherein the entity user provides a reward to the person based on the information about the partnership.

3. The method of claim 2, wherein the reward comprises granting the person access to a loyalty program associated with the entity user.

4. The method of claim 3, wherein the loyalty program grants the person access to a private website external to the social networking system.

5. The method of claim 3, wherein the loyalty program grants the person one or more discounts on goods and services.

6. The method of claim 2, wherein the reward from the entity user comprises providing products or services associated with the entity user to the person at a reduced price.

7. The method of claim 1 further comprising:
    receiving a request to connect another person associated with another user profile and the entity user in the social networking system; and
    responsive to receiving the request, storing a unilateral connection between the entity page and the other user profile for the other person without modifying the other user profile associated with the other person to display the item of media content associated with the entity user.

8. The method of claim 1, wherein the user profile includes:
    a representation of the user profile, the representation including visual representations of one or more objects associated with the user profile; and
    wherein modifying the user profile comprises:
    modifying the displayed representation of the user profile to include the item of media content associated with the entity user.

9. The method of claim 1, wherein receiving the confirmation to establish the partnership between the person and the entity user comprises:
    receiving a fee from the entity user.

10. The method of claim 1, wherein the entity is notified of the partnership request responsive to the person meeting one or more partnership criteria associated with the entity user.

11. The method of claim 1, wherein the partnership request is received responsive to the social networking system transmitting a suggestion to establish the partnership with the entity user to the person.

12. The method of claim 11, wherein the suggestion to establish the partnership with the entity user is based on one or more actions of the person stored by the social networking system.

13. The method of claim 11, wherein the suggestion to establish the partnership with the entity user is based on characteristics of the person stored in the user profile.

14. A method comprising:
    storing, in a social networking system, a user profile for a person, the user profile associated with one or more user objects stored by the social networking system;
    storing, in the social networking system, a plurality of entity pages each associated with a non-person entity user;
    for each of the entity users, determining the person's affinity for the entity user;
    selecting a suggested entity user based on the affinities;
    sending to the person a suggestion to establish a partnership with the suggested entity user;
    based on the suggestion, receiving, from the person, a request to establish the partnership between the person and the suggested entity user;

receiving, from the suggested entity user, a confirmation to establish the partnership between the person and the suggested entity user; and responsive to receiving the confirmation to establish the partnership and throughout the duration of the partnership:

providing information about the partnership to the suggested entity user, wherein the suggested entity user provides a reward to the person based on the information about the partnership;

automatically modifying the entity page associated with the suggested entity user to include a user object of the one or more user objects associated with the user profile of the person, the user object at least in part related to the entity user; and displaying the modified entity page to one or more users of the social networking system.

15. The method of claim 14, wherein selecting a suggested entity user based on the affinities comprises:

ranking the entity users based on the determined affinities; and selecting the suggested entity user based on the ranking.

16. The method of claim 14, further comprising:

responsive to receiving the confirmation to establish the partnership:

providing, to the person, an item of media content associated with the suggested entity user the item of media content not accessible to persons not having a partnership with the suggested entity user.

17. The method of claim 16, further comprising:

responsive to receiving a request from the person, modifying the user profile of the person to include the item of media content associated with the suggested entity user.

18. The method of claim 14, wherein selecting the suggested entity user based on the affinities comprises:

ranking the entity users based on the affinities;

determining whether the person satisfies criteria provided by the entity users; and selecting the suggested entity user based on the ranking and whether the person satisfies criteria provided by the entity users.

19. A method comprising:

storing, in a social networking system, a user profile for a person, the user profile associated with one or more user objects stored by the social networking system;

storing, in the social networking system, an entity page associated with a non-person entity user, the entity page displayed to one or more users of the social networking system not connected to the entity user;

receiving, from the person, a request to establish a partnership between the person and the entity user; and responsive to receiving the request to establish the partnership and throughout the duration of the partnership:

automatically modifying the entity page to include a user object of the one or more user objects associated with the user profile of the person, the user object at least in part related to the entity user; and displaying the modified entity page to one or more users of the social networking system.

20. The method of claim 19, further comprising:

requesting approval of the partnership from the entity user; and responsive to the entity user approving the partnership:

modifying the entity page to include a user object of the one or more user objects associated with the user profile of the person; and displaying the modified entity page to one or more users of the social networking system.

21. The method of claim 20, wherein requesting approval of the partnership from the entity user comprises:

determining a number of existing partnerships between the person and other entity users; and responsive to the number of existing partnerships not exceeding a threshold number, requesting approval of the partnership from the entity user.

22. The method of claim 19, wherein requesting approval of the partnership from the entity user comprises:

determining whether the user profile includes data satisfying one or more partnership criteria specified by the entity user; and responsive to the user profile including data satisfying the one or more partnership criteria, requesting approval of the partnership from the entity user.

* * * * *